(12) United States Patent
Nasu et al.

(10) Patent No.: US 8,449,226 B2
(45) Date of Patent: May 28, 2013

(54) THROW-AWAY CUTTING INSERT AND CUTTING TOOL WITH REPLACEABLE CUTTING EDGE USING THE SAME

(75) Inventors: Kazuchika Nasu, Itami (JP); Atsuhiko Maeta, Itami (JP)

(73) Assignee: Sumitomo Electric Hardmetal, Corp., Osaka-shi, Osaka (JP)

( * ) Notice: Subject to any disclaimer, the term of this patent is extended or adjusted under 35 U.S.C. 154(b) by 1785 days.

(21) Appl. No.: 11/458,372

(22) Filed: Jul. 18, 2006

(65) Prior Publication Data
US 2007/0041798 A1    Feb. 22, 2007

(30) Foreign Application Priority Data

Aug. 1, 2005 (JP) .................................. 2005-222969

(51) Int. Cl.
*B23C 5/02* (2006.01)
(52) U.S. Cl.
USPC ............................. 407/114; 407/116; 407/113
(58) Field of Classification Search
USPC .................. 407/113, 114, 115, 116; 408/188, 408/713
See application file for complete search history.

(56) References Cited

U.S. PATENT DOCUMENTS

| | | | | |
|---|---|---|---|---|
| 3,060,554 A | * | 10/1962 | Kirchner | 407/47 |
| 3,271,842 A | * | 9/1966 | Breuning | 407/114 |
| 3,289,271 A | * | 12/1966 | Stier | 407/113 |
| 3,540,102 A | * | 11/1970 | Yogus et al. | 407/114 |
| 3,541,655 A | * | 11/1970 | Stier | 407/113 |
| 3,786,540 A | * | 1/1974 | Lundgren | 407/113 |
| 3,786,541 A | * | 1/1974 | Lundgren | 407/116 |
| 3,815,192 A | * | 6/1974 | Ohtsu et al. | 407/114 |
| 3,821,836 A | * | 7/1974 | Ohtsu | 407/114 |
| 4,056,872 A | * | 11/1977 | Seidel | 407/114 |
| 4,297,058 A | * | 10/1981 | Armbrust et al. | 407/113 |
| 4,334,808 A | * | 6/1982 | Seidel | 407/114 |
| 4,359,300 A | * | 11/1982 | Hazra et al. | 407/114 |
| 4,411,565 A | * | 10/1983 | Hazra et al. | 407/114 |
| 4,606,679 A | * | 8/1986 | Jeremias | 407/114 |
| 4,755,086 A | * | 7/1988 | Stashko | 407/114 |

(Continued)

FOREIGN PATENT DOCUMENTS

| | | |
|---|---|---|
| DE | 3133941 A1 * | 3/1983 |
| DE | 296 16 668 | 2/1995 |
| EP | 205977 A2 * | 12/1986 |
| EP | 06253902.8 | 1/2007 |

(Continued)

OTHER PUBLICATIONS

Indexable inserts for cutting tools-Designation, JIS Handbook (JIS B4120), Revised on Aug. 20, 1998, Japanese Industrial Standards Committee, Japanese Standards Association.

*Primary Examiner* — Kenneth E Peterson
*Assistant Examiner* — Jennifer Swinney
(74) *Attorney, Agent, or Firm* — Ditthavong Mori & Steiner P.C.

(57) ABSTRACT

The present invention includes a first ridge line positioned at an intersection between a first surface and an upper side section of a side surface along the first surface; and a second ridge line positioned at an intersection between a second surface and a lower side section along the second surface of the side surface. A cutting section is formed at the first ridge line with the first surface forming a rake face. A second cutting section is formed at the second ridge line with the lower side section along the second surface of the side surface forming a rake face. Selective use can be made of the first cutting section and the second cutting section.

8 Claims, 10 Drawing Sheets

U.S. PATENT DOCUMENTS

| | | | |
|---|---|---|---|
| 5,256,009 A * | 10/1993 | Stoffels | 407/42 |
| 5,954,459 A * | 9/1999 | Noguchi et al. | 408/59 |
| 6,152,658 A * | 11/2000 | Satran et al. | 407/103 |
| 6,167,958 B1 * | 1/2001 | Lynde | 166/55.6 |
| 6,874,979 B2 * | 4/2005 | Takiguchi et al. | 408/227 |
| 6,939,090 B1 | 9/2005 | Nagaya et al. | |
| 7,278,805 B2 * | 10/2007 | Ley | 407/114 |

FOREIGN PATENT DOCUMENTS

| | | |
|---|---|---|
| JP | 62-178010 U | 11/1987 |
| JP | 64-056903 U | 4/1989 |
| JP | 2003-275920 A | 9/2003 |
| JP | 2005-222969 | 8/2008 |
| WO | WO 97/17157 | 5/1997 |

* cited by examiner

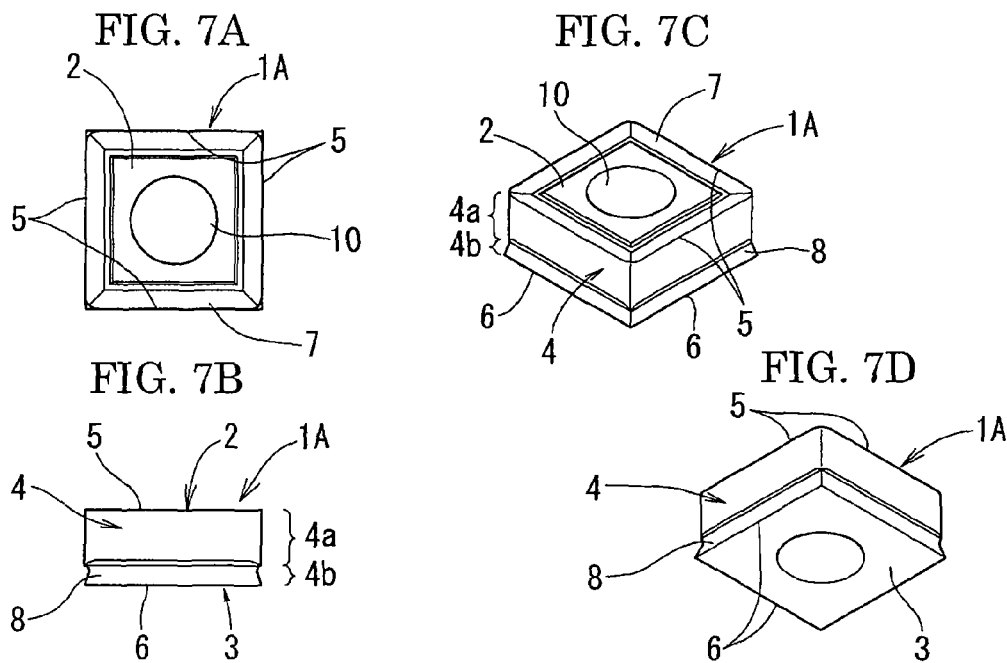
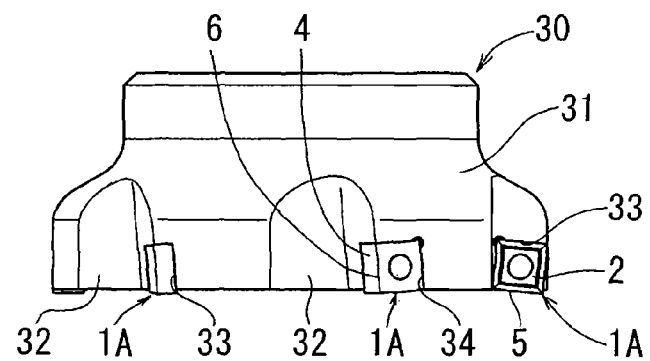

THROW-AWAY CUTTING INSERT AND CUTTING TOOL WITH REPLACEABLE CUTTING EDGE USING THE SAME

INCORPORATION BY REFERENCE

The present application claims priority under 35 U.S.C. §119 to Japanese Patent Application No. 2005-222969 filed on Aug. 1, 2005. The content of the application is incorporated herein by reference in its entirety.

BACKGROUND OF THE INVENTION

1. Field of the Invention

The present invention relates to a replaceable cutting tool for drills, end mills, and milling cutters and a throw-away insert used as a blade therefor.

2. Description of the Background Art

Throw-away inserts primarily belong to two main groups: the type described in the JIS handbook (JIS B4120), i.e., the negative type, having parallel upper and lower surfaces with side surfaces intersecting at 90 degree angles; and the positive type, where the side surfaces form acute angles with the upper surface and obtuse angles with the lower surface. In negative throw-away inserts, the upper and lower surfaces are identical, so that the sides of the upper surface (the ridge lines formed by the intersections with the side surfaces) and the sides of the lower surfaces can be used as cutting sections, making the structure economical. While the cutting edge is strong, negative inserts do not provide clean cuts and the cutting force is high.

With positive throw-away inserts, cuts are clean and cutting force is low, but the strength of the cutting edge is less than that of negative inserts, and there are fewer usable corners for cutting.

FIG. 19 shows another type of throw-away insert. In this "longitudinal-use" throw-away insert, a side surface 53 serves as the rake face, and a ridge line 54, where upper and lower surfaces 51, 52 intersect with the side surface 53 serves as the cutting section.

This type of throw-away insert is used for pin milling cutter, in which strength is important. However, the narrow area of the rake face makes it difficult to improve chip handling, and cutting force also tends to be high.

Conventional throw-away inserts are used for single functions, forcing trade-offs of advantages and disadvantages as described above. The object of the present invention is to provide a multi-functional throw-away insert. More specifically, the object of the present invention is to: allow use of a longitudinal-use structure while providing functions similar to those of positive and negative inserts; provide improved cutting edge strength, improved cleanness of cut, and reduced cutting force; and increase the number of usable corners.

SUMMARY OF THE INVENTION

In order to overcome these problems, the present invention provides a throw-away insert including a first surface and a second surface facing each other, a side surface being formed between the first surface and the second surface. A first ridge line is formed at a position where the first surface and the side surface intersects. A second ridge line is formed at a position where the second surface and the side surface intersect. The first surface acts as a first rake face and the first ridge line forms a first cutting section. The side surface acts as a second rake face and the second ridge line forms a second cutting section. Selection can be performed between the first cutting section and the second cutting section.

More detailed descriptions and preferable descriptions of this throw-away insert are listed below. (1) A side of the side surface along the first surface intersects with the first surface at an acute angle, and a side of the side surface along the second surface intersects with the second surface at an acute angle. (2) A side of the side surface along the first surface intersects with the first surface at an acute angle, and a side of the side surface along the second surface intersects with the second surface at a right angle. (3) A side of the side surface along the first surface intersects with the first surface at a right angle, and a side of the side surface along the second surface intersects with the second surface at a right angle. (4) A side of the side surface along the first surface intersects with the first surface at a right angle, and a side of the side surface along the second surface intersects with the second surface at an acute angle. (5) Chip breakers (these can be standard breaker grooves) are disposed at a region of the first surface along the first ridge line and a region of the side surface along the second ridge line. (6) The first surface when seen from above or the second surface when seen from below forms a polygonal shape; and ridge lines having identical shapes are formed between corners of the first surface or between corners of the second surface. (7) The first surface and the second surface have different shapes.

In the throw-away insert of the present invention, the first cutting section formed by the first ridge line and the second cutting section formed by the second ridge line can be used separately according to need. If the first cutting section is to be used, the throw-away insert is positioned flat as in a standard lateral insert, and the first surface serves as the rake face. Thus, the area of the rake face can be increased and chip handling can be improved. Also, by having the side surface intersect with the first surface at an acute angle, the first cutting section can be made sharp, thus making the cut cleaner.

If the side surface is to serve as the rake face and the second cutting section is to be used, the throw-away insert is used longitudinally. The increased back metal provides a high degree of strength. Thus, by using the throw-away insert of the present invention, it is possible to meet both the need to maintain good chip handling and clean cuts as well as the need for strength.

If the first surface or the second surface intersects at an acute angle with the side surface, a cleaner cut can be achieved with the first cutting section or the second cutting section.

Also, if the first surface or the second surface intersects at a right angle with the side surface, the strength of the first cutting section of the second cutting section is increased.

Also, if a chip breaker is provided at the region of the first surface along the first ridge line and the region of the side surface, chip handling for the first cutting section and the second cutting section is improved. By using different shapes for the chip breaker provided on the first surface and the chip breaker provided on the side surface, it is possible to create a difference between the chip handling for the first cutting section and the chip handling for the second cutting section. The shape of the chip breaker can be varied by changing the width, depth, or shape.

In addition, if the first surface and the second surface are made polygonal and identically shaped ridge lines are formed between the corners, the number of corners that can be used is increased, providing improved economic advantages. Also, if the shapes of the first surface and the second surface are made different, the shapes of the first cutting section and the second section can be made different, improving the degree of freedom in the design of the shapes of the cutting sections.

Also, the corners of the first surface and the second surface can have different phases. With this structure, the side surface takes on a helical shape. When this insert is used longitudinally, the direction of chip ejection is determined by the helical side surface. Thus, by setting up the helical shape and direction of the side surface, it is possible to improve curling and splitting properties of the chips. Furthermore, it is also possible to guide chips in the direction opposite from the main unit of the cutter, thus reducing damage to the main unit. Also, since a relief is formed at one of the corners, the positioning of the insert during tool design is made easier.

BRIEF DESCRIPTION OF THE DRAWINGS

FIG. 7A: A plan drawing showing another example of a throw-away insert according to the present invention;

FIG. 7B: A side-view drawing of the insert;

FIG. 7C: A perspective drawing of the upper surface side of the insert;

FIG. 7D: A perspective drawing of the lower surface side of the insert;

FIG. 8: A side-view drawing of a milling cutter that uses the throw-away insert from FIG. 7;

DETAILED DESCRIPTION OF THE INVENTION

Figure 1A:
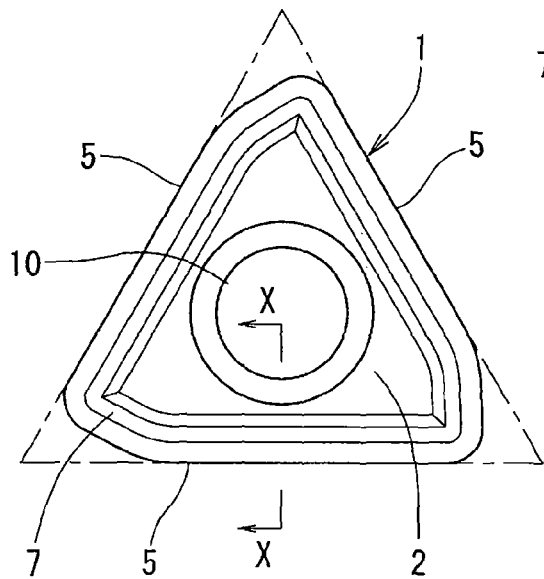
FIG. 1A: A plan drawing showing an example of a throw-away insert according to the present invention.
Figure 1B:
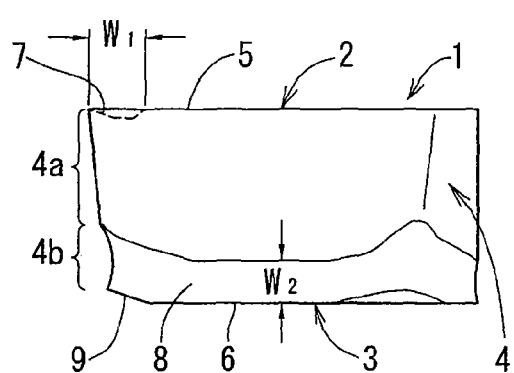
FIG. 1B: A side-view drawing of the insert.
Figure 1C:
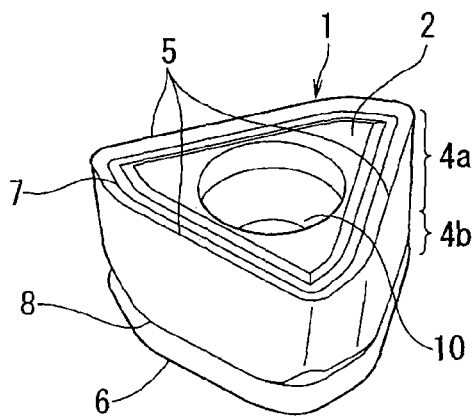
FIG. 1C: A perspective drawing of the upper surface side of the insert.
Figure 1D:
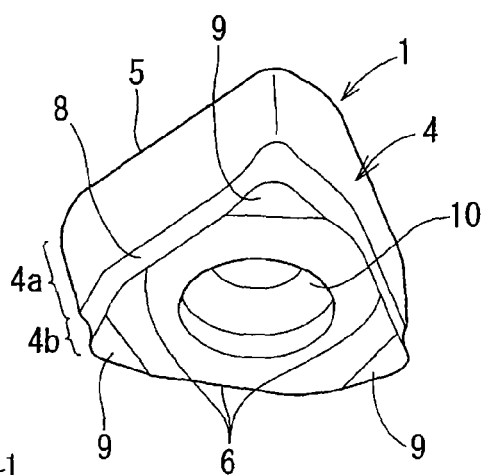
FIG. 1D: A perspective drawing of the lower surface side of the insert.
Figure 1E:
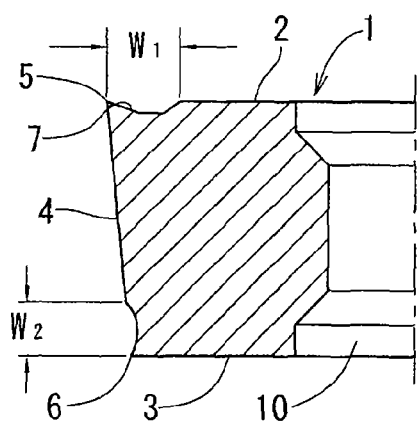
FIG. 1E: An cross-section detail drawing along the X-X line of FIG. 1A.

The embodiments of a throw-away insert according to the present invention will be described, with references to the attached figures. FIG. 1 shows a first embodiment. A throw-away insert 1 has as its base a positive insert with a basic shape that is triangular, equipped with: a first surface (hereinafter referred to as upper surface) 2; a second surface (hereinafter referred to as lower surface) 3 facing the upper surface 2; and a side surface 4 formed between the upper and lower surfaces. From this basic triangular shape, the sections indicated by the dotted lines in FIG. 1 are removed so that both the plan-view shape of the upper surface 2 and the bottom-view shape of the lower surface 3 form irregular hexagons.

A section (hereinafter referred to as upper side section) 4a of the side surface 4 along the upper surface 2 intersects at an acute angle with the upper surface 2, and a first angular cutting edge is formed from a first ridge line 5 positioned at the intersection between the upper side section 4a and the upper surface 2. Also, a section (hereinafter referred to as lower side section) 4b of the side surface 4 along the lower surface 3 is continuous with and forms an angle with the upper side section 4a, and a second cutting edge is formed from a second ridge line 6 positioned at the intersection between the lower side section 4b and the lower surface 3.

Furthermore, chip breakers (breaker grooves in the figures) 7, 8 for chip handling are provided at the region of the upper surface 2 along the first ridge line 5 and the lower side section 4b of the side surface 4 along the second ridge line 6. In order to control chips generated when used as an outer perimeter edge of a drill operated at a high cutting speed, the chip breaker 7 at the upper surface is set up so that its width $w_1$ is greater than a width $w_2$ of the chip breaker 8 at the side surface.

In addition, bevels 9 are formed at the corner sections of the lower surface 3 so that the corner ends are slanted toward the upper surface. The regions of the second ridge line 6 between adjacent bevels 9, 9 can be used efficiently as the second cutting sections. The throw-away insert 1 shown as an example includes a clamp hole 10, but the clamp hole 10 is not required and the securing of the throw-away insert can be performed with a clamping shoe, wedge, or the like.

Figure 2:
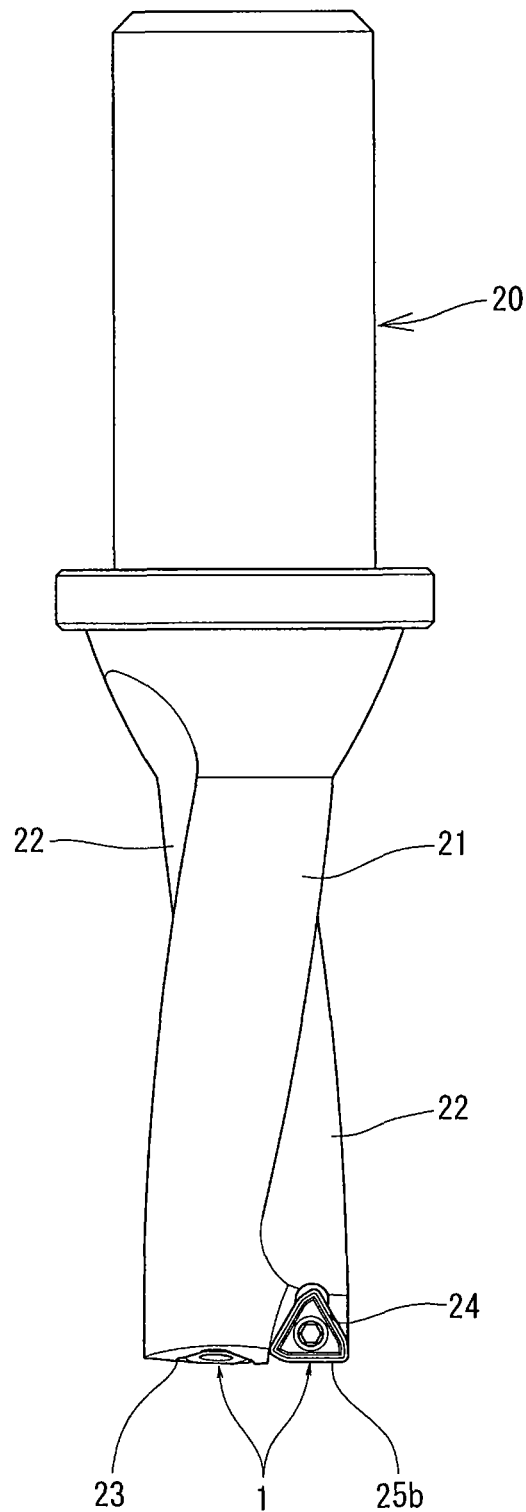
FIG. 2: A front-view drawing of a drill using the throw-away insert from FIG. 1.
Figure 3:
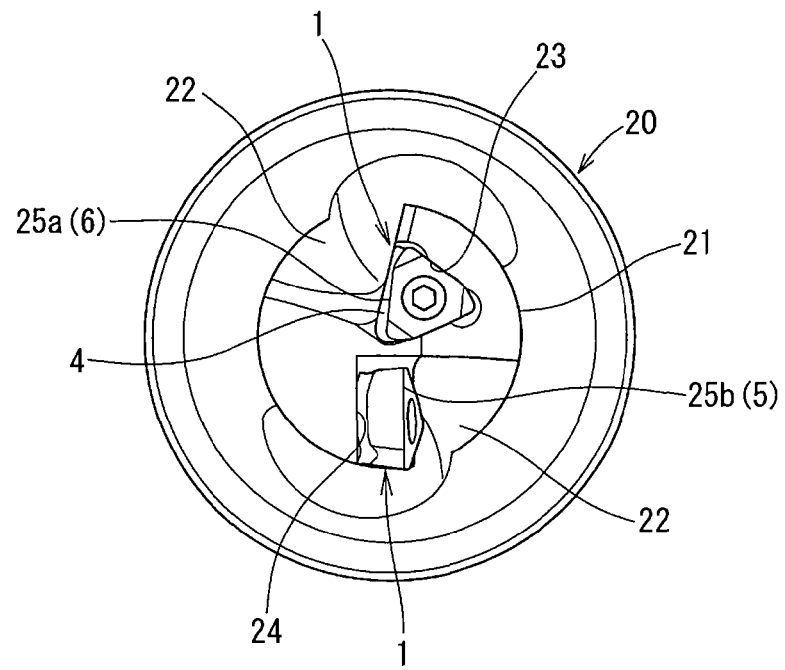
FIG. 3: A front-view drawing of the drill from FIG. 2.
Figure 4:
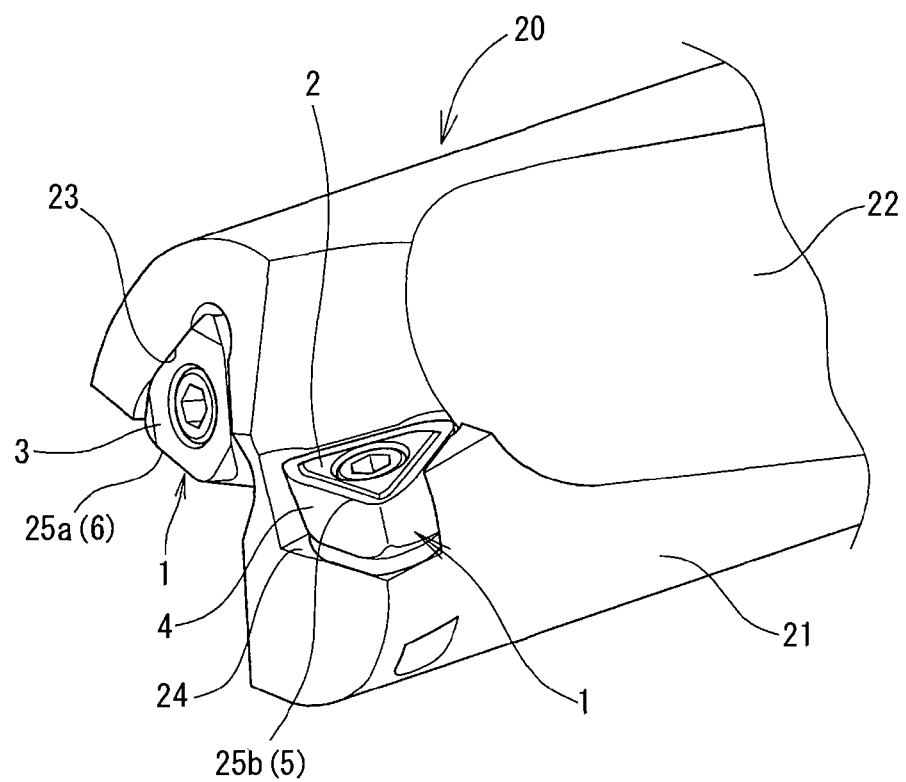
FIG. 4: A perspective drawing of the main elements of the drill from FIG. 2.

FIG. 2 through FIG. 4 show an example of how the throw-away insert according to the first embodiment is used (drill with replaceable cutting edge). In a drill 20 shown in the example, two helical flutes (chip flutes) 22, 22 are provided at the outer perimeter of a main drill unit 21. Throw-away inserts 1 are mounted on insert seats 23, 24 provided at the ends of the helical flutes 22, 22.

The throw-away inserts 1, 1 are mounted so that one insert is mounted longitudinally toward the rotation center of the main drill unit 21 while the other insert is mounted flat toward the outer perimeter of the main drill unit 21.

In the longitudinal throw-away insert 1 mounted on the insert seat 23 toward the rotation center of the drill, the side surface 4 acts as a rake face, the lower surface 3 acts as the flank face at the tip of the drill, and the second ridge line 6 acts as the cutting section. In the flat throw-away insert 1 mounted on the insert seat 24 toward the outer perimeter of the drill, an upper surface 2 acts as a rake face, the side surface 4 acts as the flank face at the tip of the drill, and the first ridge line 5 acts as the cutting section.

In the drill shown in the example, the cutting section formed by the second ridge line 6 serves as a center blade 25a, and the cutting section formed by the first ridge line 5 serves as an outer perimeter blade 25b. The two throw-away inserts 1, 1 are positioned so that the paths of the center blade 25a and the outer perimeter blade 25b partially overlap, and the two throw-away inserts 1, 1 share in the cutting of the cutting region. The throw-away insert 1 that is longitudinally mounted in the insert seat 23 is provided adequate back metal so that a high degree of strength is provided. For the throw-away insert 1 that is mounted flat in the insert seat 24, axial rake angle can be set freely without restrictions imposed by the longitudinal throw-away insert, thus making it possible to provide a positive axial rake angle and a clean cut.

Figure 5A:
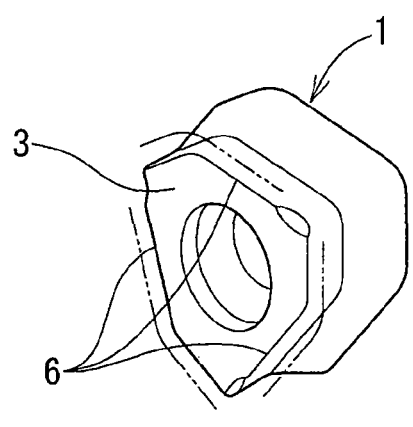
FIG. 5A: A perspective drawing showing the usage regions of a second ridge line of the throw-away insert from FIG. 1.
Figure 5B:
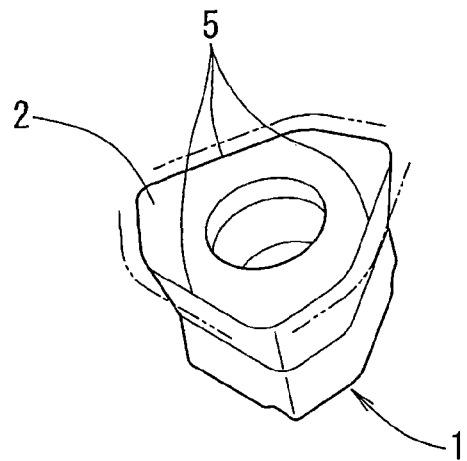
FIG. 5B: A perspective drawing showing the usage regions of a first ridge line of the throw-away insert from FIG. 1.
Figure 6:
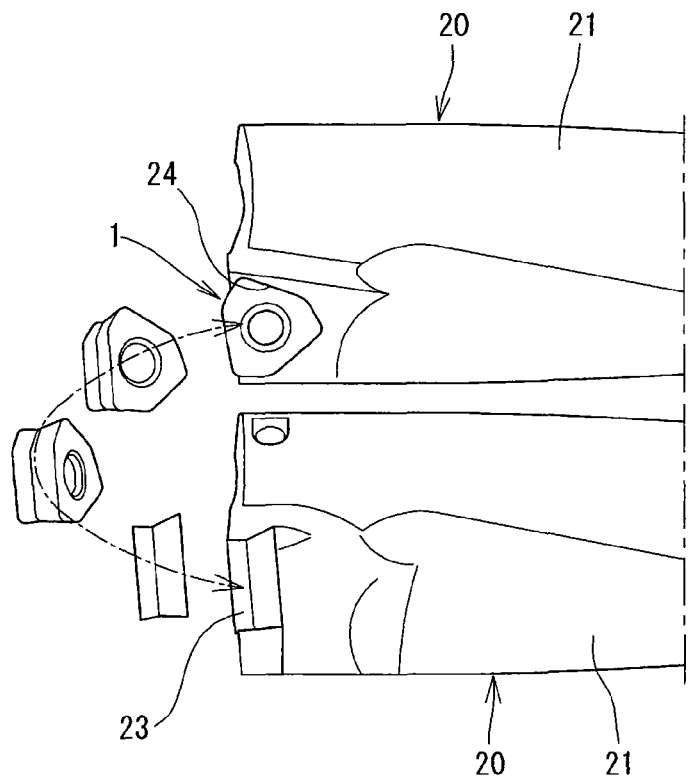
FIG. 6: A line drawing showing how longitudinal and flat throw-away inserts are switched in the drill from FIG. 2.

As shown in FIG. 5A and FIG. 5B, in the throw-away inserts 1 used in the drill of this example, there are three second ridge lines 6 and three first ridge lines 5. Thus, a total of six corners can be used, making the design economical. As shown in FIG. 6, the longitudinal throw-away insert 1 can be turned approximately 90 degrees and moved to the insert seat 24 to become the flat throw-away insert 1, and the flat throw-away insert 1 can be turned approximately 90 degrees and moved to the insert seat 23 to become the longitudinal throw-away insert 1. By repeating this rotation, the six corners can be used without any waste.

FIG. 7 shows another example of a throw-away insert according to the present invention. This throw-away insert 1A is based on a positive, square insert, and the first ridge line 5 serving as the first cutting section is positioned where the upper side section 4a intersects at a right angle with the upper surface 2. The second ridge line 6 serving as the second cutting section is positioned where the lower side section 4b intersects with the lower surface 3. Furthermore, a region of the upper surface 2 extending along the first ridge line 5 and the lower side section of the side surface 4 along the second ridge line 6 are formed as chip breakers 7, 8 respectively (breaker grooves in the figure). With the chip breakers 7, 8, the cutting angles of the first and second cutting sections formed by the first ridge line 5 and the second ridge lines 6 are both no more than 90 degrees.

Figure 9:
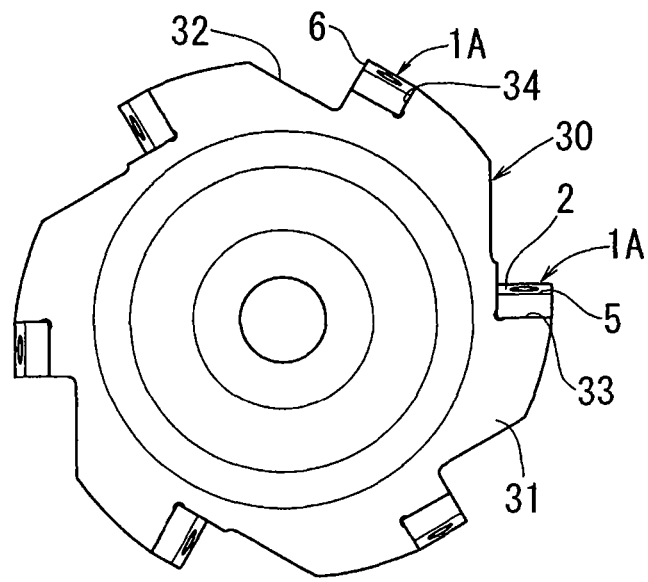
FIG. 9: A front-view drawing of the milling cutter from FIG. 8.
Figure 10:
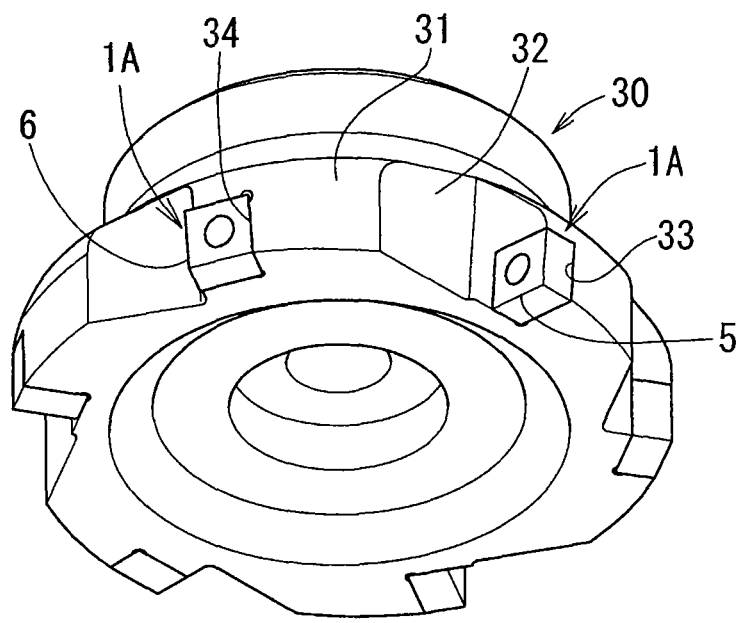
FIG. 10: A perspective drawing of the milling cutter from FIG. 8.
Figure 11A:
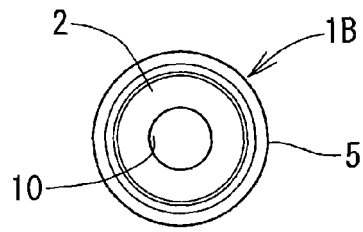
FIG. 11A: A plan drawing showing yet another example of a throw-away insert according to the present invention.
Figure 11D:
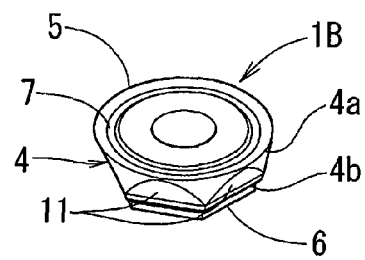
FIG. 11D: a perspective drawing of the upper surface side of the insert.
Figure 11B:
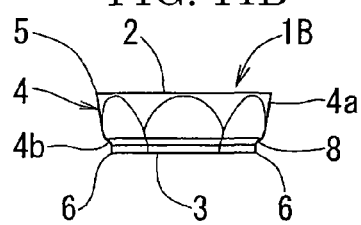
FIG. 11B: A side-view drawing of the insert.
Figure 11E:
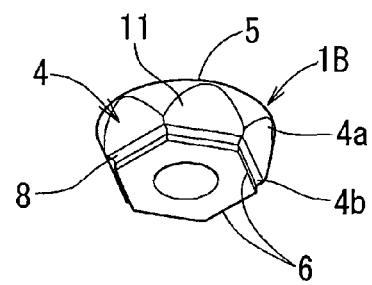
FIG. 11E: A perspective drawing of the lower surface side of the insert.
Figure 11C:
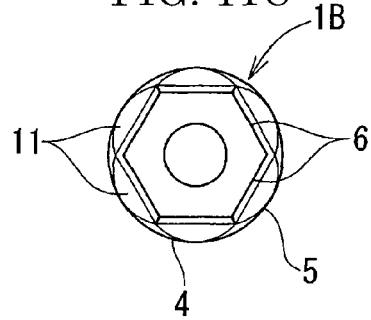
FIG. 11C: A bottom-view drawing of the insert.
Figure 12:
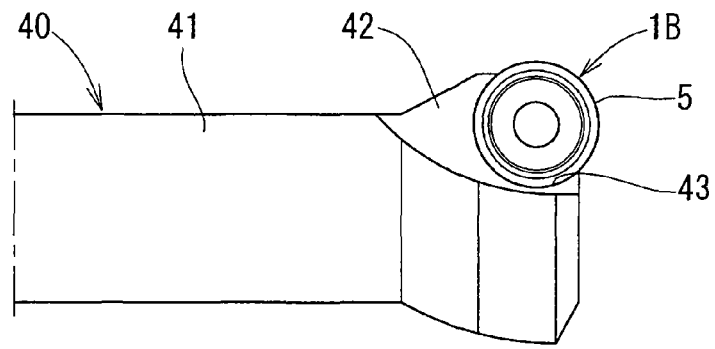
FIG. 12: A side-view drawing of a radius end mill that uses the throw-away insert from FIG. 11.
Figure 13:
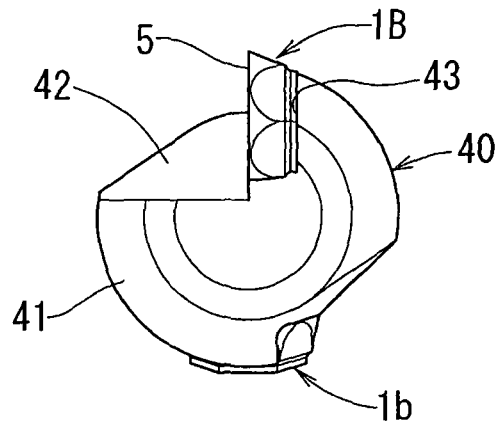
FIG. 13: A front-view drawing of the radius end mill from FIG. 12.
Figure 14:
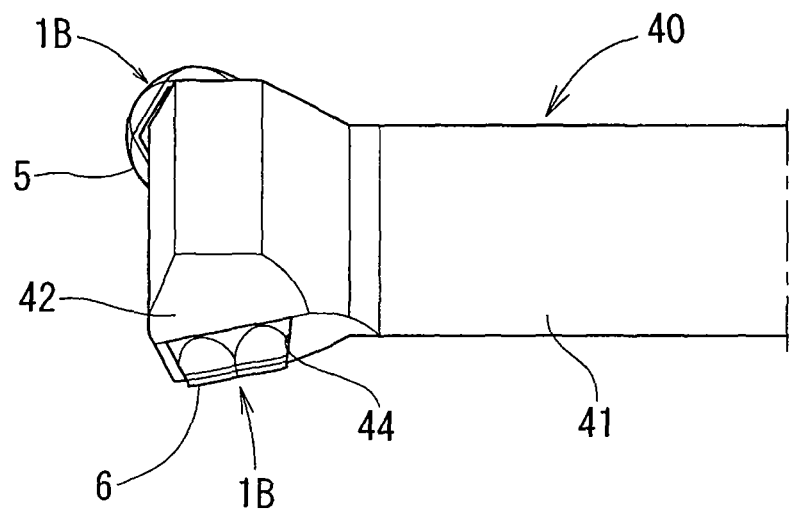
FIG. 14: A side-view drawing of the radius end mill from FIG. 12 turned 180 degrees.
Figure 15:
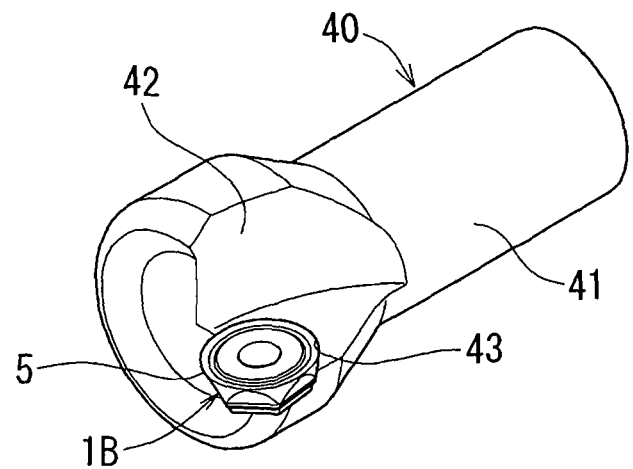
FIG. 15: A perspective drawing of the radius end mill from FIG. 12.
Figure 16:
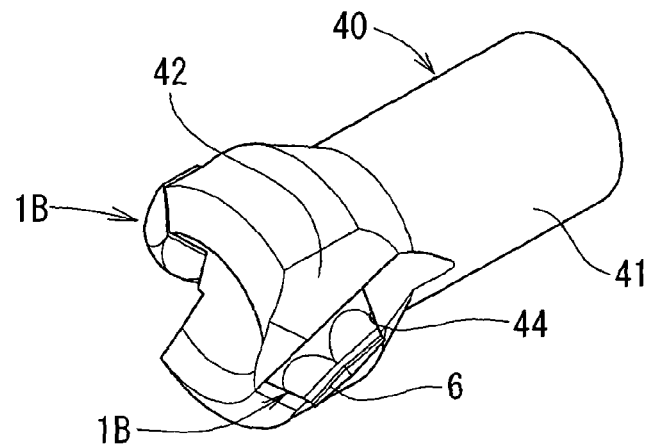
FIG. 16: A perspective drawing of the radius end mill from FIG. 15 turned 180 degrees.
Figure 17A:
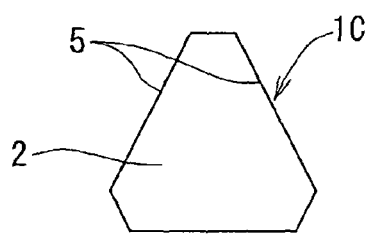
FIG. 17A: A plan drawing showing yet another example of a throw-away insert according to the present invention.
Figure 17B:
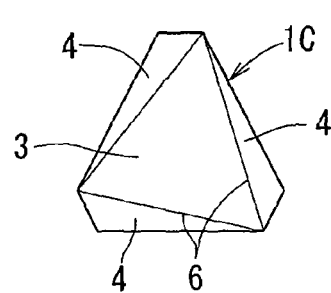
FIG. 17B: A bottom-view drawing of the insert.
Figure 17C:
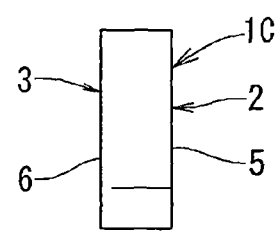
FIG. 17C: A side-view drawing of the insert.
Figure 17D:
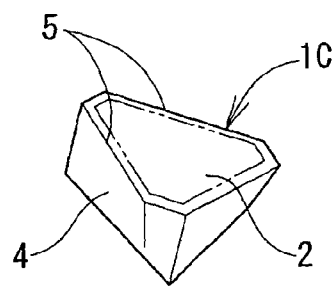
FIG. 17D: a perspective drawing of the upper surface side of the insert.
Figure 17E:
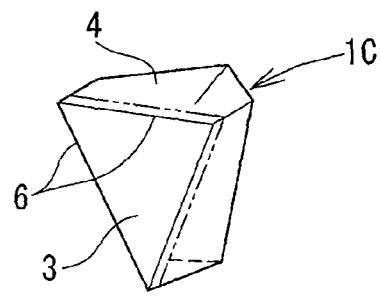
FIG. 17E: A perspective drawing of the lower surface side of the insert.
Figure 18A:
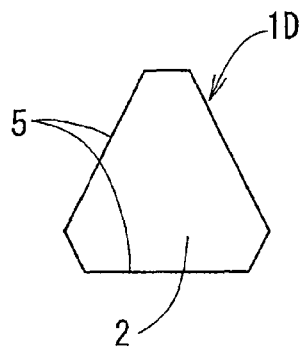
FIG. 18A: A plan drawing showing yet another example of a throw-away insert according to the present invention.
Figure 18B:
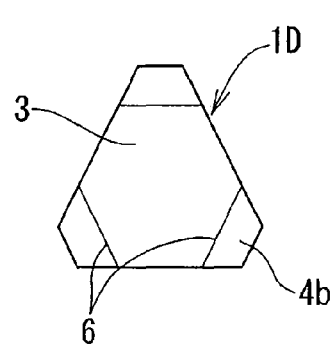
FIG. 18B: A bottom-view drawing of the insert.
Figure 18C:
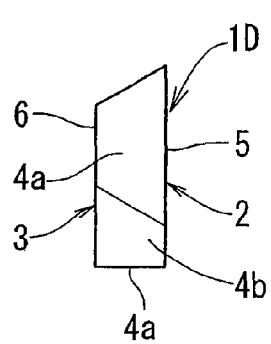
FIG. 18C: A side-view drawing of the insert.
Figure 18D:
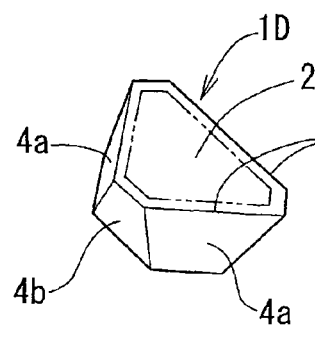
FIG. 18D: A perspective drawing of the upper surface side of the insert.
Figure 18E:
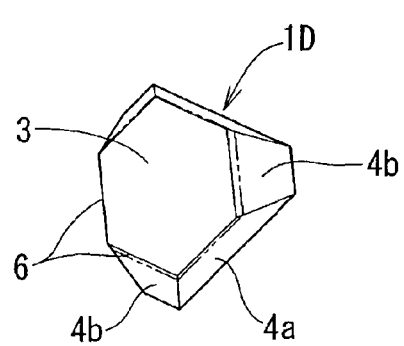
FIG. 18E: A perspective drawing of the lower surface side of the insert.
Figure 19:
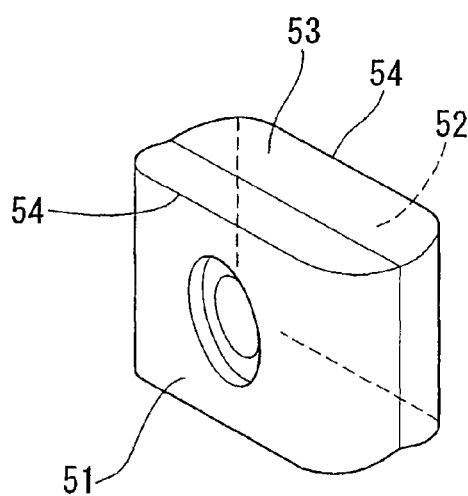
FIG. 19: A perspective drawing showing an example of a conventional throw-away insert.

FIG. 8 through FIG. 10 show an example of how the throw-away insert 1A is used (in a throw-away type milling cutter). Insert seats 33, 34 facing chip pockets 32 on the outer perimeter section at the end of a main cutter unit 31 are alternated along the perimeter. Throw-away inserts 1A are mounted on the insert seats 33 laterally so that the upper surface 2 acts as the rake face, and identical throw-away inserts 1A are mounted longitudinally on the insert seats 34 so that the side surface 4 acts as the rake face. In this milling cutter 30, the first ridge line 5 of the lateral throw-away inserts perform finishing on the bottom surface of the workpiece, while the second ridge line 6 of the longitudinal throw-away inserts 1A perform heavy cutting of the walls of the workpiece.

FIG. 11 shows yet another example of a throw-away insert according to the present invention. This throw-away insert 1B is based on a positive, circular shoe insert and is equipped with the first ridge line 5 serving as the first cutting section positioned where the upper side section 4a of the side surface 4 intersects at a right angle with the upper surface 2. Also, the lower surface 3 is formed as an equilateral hexagon and is equipped with the second ridge line 6 serving as the second cutting section positioned where the lower side section 4b of the side surface 4 intersects with the lower surface 3. Furthermore, chip breakers 7, 8 (breaker grooves in the figure) are provided at the region of the upper surface 2 along the first ridge line 5 and the lower side section of the side surface 4 along the second ridge line 6, respectively.

FIG. 12 through FIG. 16 show an example of how this throw-away insert 1B is used (in a throw-away type radius end mill). Insert seats 43, 44 are provided at the end of a main end mill unit 41 facing chip pockets 42 and positioned at rotationally symmetrical positions along the outer perimeter section. The throw-away inserts 1B are mounted laterally on the insert seats 43 and longitudinally on the insert seats 44. In this radius end mill 40, the first ridge line 5 of the lateral throw-away inserts cut the corner radius curve sections of the workpiece, while the second ridge line 6 of the longitudinal throw-away inserts cut the walls of the workpiece. If the lower surface 3 is made polygonal while the upper surface 2 is circular, a shelf is created between the chip breaker 8 and the upper side section 4a of the side surface 4. As shown in FIG. 11, however, this shelf can be made smaller by providing a flat bevel 11 on the upper side section 4a of the side surface 4.

FIG. 17 and FIG. 18 show yet another example of a throw-away insert according to the present invention. In FIG. 17, a throw-away insert 1C is formed with the upper surface 2 having an irregular hexagonal shape and the lower surface 3 having a triangular shape. Between the irregular upper surface 2 and the lower surface 3, the side surface 4 is provided with intersection angles relative to the upper surface 2 and the lower surface 3 varying from one end to the other. The upper surface 2 can act as the rake face with the first ridge line 5 forming the first cutting section providing clean cuts. Alternatively, the side surface 4 can act as the rake face with the second ridge line 6 forming the second cutting section having a high degree of strength. The first cutting section and the second cutting section can be used depending on the application.

In FIG. 18, a throw-away insert combines the upper surface 2 having an irregular hexagonal shape and the lower surface 3 having an equilateral hexagonal shape. In this case also, the first ridge line 5 and the second ridge line 6 can be used separately as the first and second cutting sections. In this throw-away insert 1D, side surfaces 4a, which intersect at right angles with the upper surface 2 and the lower surface 3, alternate with side surfaces 4b, which intersect at an acute angle with the upper surface 2 and at an obtuse angle with the lower surface 3. However, it would be possible to have all the side surfaces intersect with the upper surface 2 at an acute angle by making the lower surface 3 and keeping the second ridge line 6 from overlapping with the first ridge line 5.

What is claimed is:

1. A throw-away insert including a first surface and a second surface facing each other, a side surface being formed between said first surface and said second surface, said throw-away insert comprising:

a first ridge line formed at a position where said first surface and said side surface intersects; and a second ridge line formed at a position where said second surface and said side surface intersect; wherein:

said first surface acts as a first rake face and said first ridge line forms a first cutting section; said side surface acts as a second rake face and said second ridge line forms a second cutting section; and selection can be performed between said first cutting section and said second cutting section, and wherein chip breakers are disposed at a region of said first surface along said first ridge line and a region of said side surface along said second ridge line, wherein said first surface and said second surface have different shapes, and there are no chip breakers on said second surface.

2. A throw-away insert according to claim 1 wherein: a side of said side surface along said first surface intersects with said first surface at an acute angle; and a side of said side surface along said second surface intersects with said second surface at an acute angle.

3. A throw-away insert according to claim 1 wherein: a side of said side surface along said first surface intersects with said first surface at an acute angle; and a side of said side surface along said second surface intersects with said second surface at a right angle.

4. A throw-away insert according to claim 1 wherein: a side of said surface along said first surface intersects with said first surface at a right angle; and a side of said side surface along said second surface intersects with said second surface at a right angle.

5. A throw-away insert according to claim 1 wherein: a side of said side surface along said first surface intersects with said first surface at a right angle; and a side of said side surface along said second surface intersects with said second surface at an acute angle.

6. A throw-away insert according to claim 1 wherein: said first surface when seen from above or said second surface when seen from below forms a polygonal shape; and ridge lines having identical shapes are formed between corners of said first surface or between corners of said second surface.

7. A cutting tool with replaceable cutting edge equipped with throw-away inserts according to claim 1 comprising: at least one throw-away insert with said first surface of said throw-away insert positioned as a rake face; and at least one throw-away insert separate from said at least one throw-away insert with said side surface of said throw-away insert positioned as a second rake face.

8. A throw-away insert according to claim 1 wherein: a cutting angle of the first and second cutting sections formed by the first ridge line and the second ridge line are both no more than 90 degrees.

\* \* \* \* \*

UNITED STATES PATENT AND TRADEMARK OFFICE
CERTIFICATE OF CORRECTION

PATENT NO. : 8,449,226 B2
APPLICATION NO. : 11/458372
DATED : May 28, 2013
INVENTOR(S) : Kazuchika Nasu et al.

It is certified that error appears in the above-identified patent and that said Letters Patent is hereby corrected as shown below:

Title Page, Item (73) Assignee: Sumitomo Electric Hardmetal, Corp., delete "Osaka-shi, Osaka (JP)", and insert --Itami-shi, Hyogo (JP)--.

Signed and Sealed this
Seventeenth Day of September, 2013

Teresa Stanek Rea
*Deputy Director of the United States Patent and Trademark Office*